Oct. 8, 1940.   G. FAST   2,217,200

BEARING

Original Filed Nov. 27, 1936   4 Sheets-Sheet 1

INVENTOR
Gustave Fast
BY
H. C. Cheseray
ATTORNEY

Oct. 8, 1940. G. FAST 2,217,200
BEARING
Original Filed Nov. 27, 1936  4 Sheets-Sheet 2

INVENTOR
Gustave Fast
BY
ATTORNEY

Oct. 8, 1940.   G. FAST   2,217,200
BEARING
Original Filed Nov. 27, 1936   4 Sheets-Sheet 3
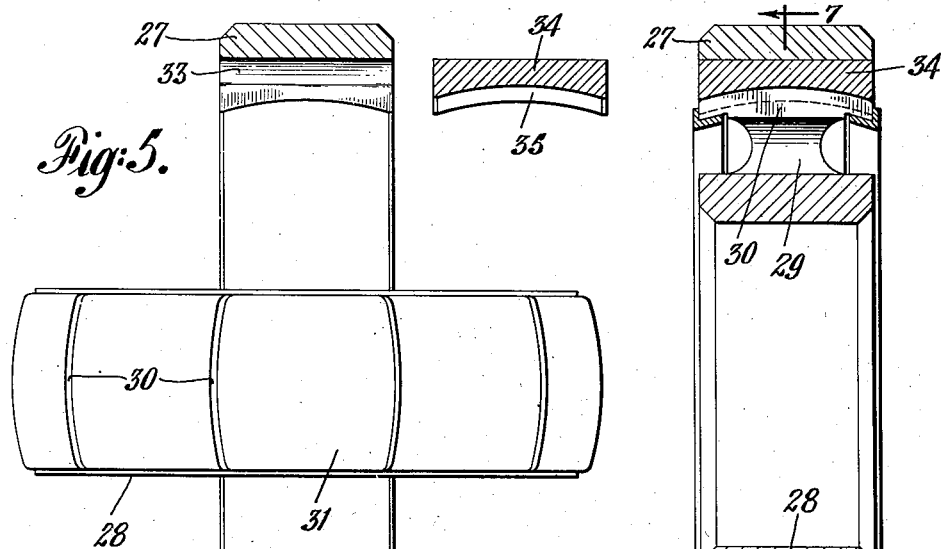
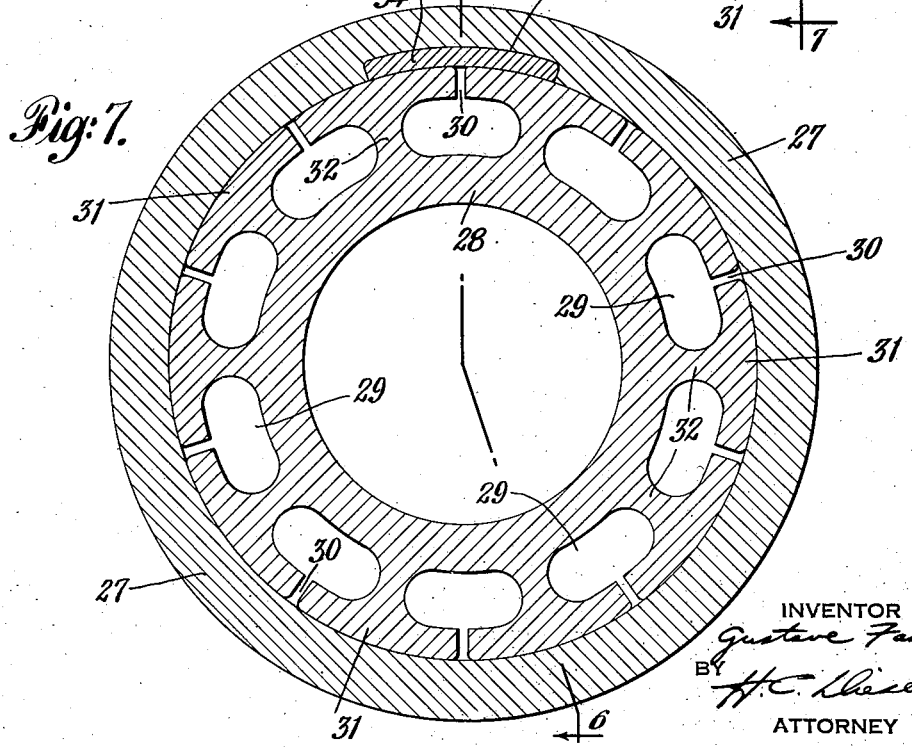

Oct. 8, 1940.   G. FAST   2,217,200
BEARING
Original Filed Nov. 27, 1936   4 Sheets-Sheet 4

INVENTOR
Gustave Fast
BY
H. C. Lieseng
ATTORNEY

Patented Oct. 8, 1940

2,217,200

UNITED STATES PATENT OFFICE 2,217,200

BEARING

Gustave Fast, Annapolis, Md., assignor to The Fast Bearing Company, Baltimore, Md., a corporation of Maryland Application November 27, 1936, Serial No. 112,891
Renewed December 18, 1939

16 Claims. (Cl. 308—73)

This invention relates to improvements in bearings of the block type in which wedge shaped lubrication films are produced between the relatively moving surfaces of a journal and bearing. It is particularly applicable to radial bearings or combined radial and thrust bearings.

Radial, block type bearings as produced heretofore have employed a series of separate shoes or blocks mounted around the periphery of a supporting ring member. This has necessitated a complicated arrangement for retaining the blocks on the ring member. Provision is ordinarily made for some relative movement between the blocks and ring member to allow an appropriate wedge shaped pocket to be formed between the face of the block and the cooperating bearing surface regardless of the direction of rotation of the journal. This not only becomes an expensive construction but it is unsatisfactory for various reasons. The relative movement between the blocks and supporting member calls for efficient lubrication of certain relatively moving surfaces and these are ordinarily located in such positions that it is difficult to provide effective lubrication. As a result some wear is almost unavoidable and this modifies or interferes with the proper relation of the parts. Moreover, in a construction of this character it is difficult to provide adequate anchorage of the block elements to the supporting member capable of resisting the centrifugal forces developed during rotation at high speeds.

By the present improvements I have retained the advantages of a separate block type bearing and have overcome the various objections thereto. A feature of the invention toward this end is the integral formation of the individual shoe or block elements with the supporting member. The connection between each block and the supporting member is such, however, that the outer, sliding face of the block may shift its position, as by tilting slightly, with relation to the member as a whole and with relation to the bearing surface in the course of rotation of the journal. In this way it is possible to develop most effective oil films without the necessity of any relative sliding movement between the blocks and their supporting member. The construction is relatively simple and inexpensive to produce, is sturdy and capable of assuming heavy loads, and, due to the integral formation of its principal parts, is of almost unlimited life.

Other features and advantages of the invention will appear from a detailed description of certain illustrative forms of the same which will now be given in conjunction with the accompanying drawings in which:

Fig. 5 is an axial view, partly in section and partly in elevation, illustrating the relation of the parts in one form of the bearing at an intermediate stage in the assembly.

Fig. 6 is an axial, sectional view through the assembled bearing taken along the line 6—6 of Figure 7.

Fig. 7 is a vertical section through the bearing along the line 7—7 of Figure 6.

Figure 1:
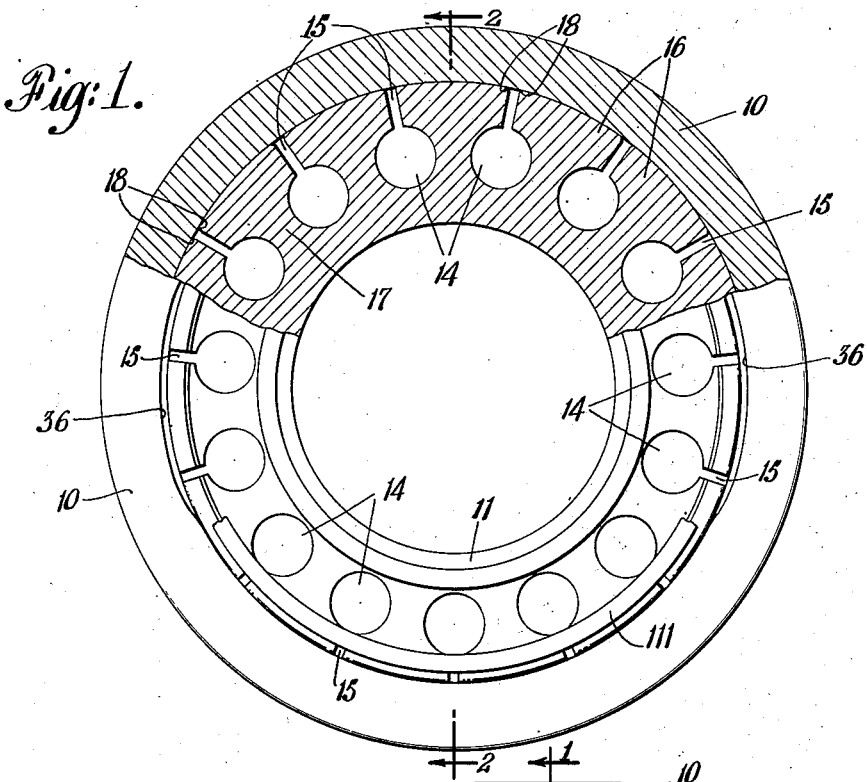
Fig. 1 is a view partly in section and partly in side elevation of a bearing embodying one form of the invention.
Figure 2:
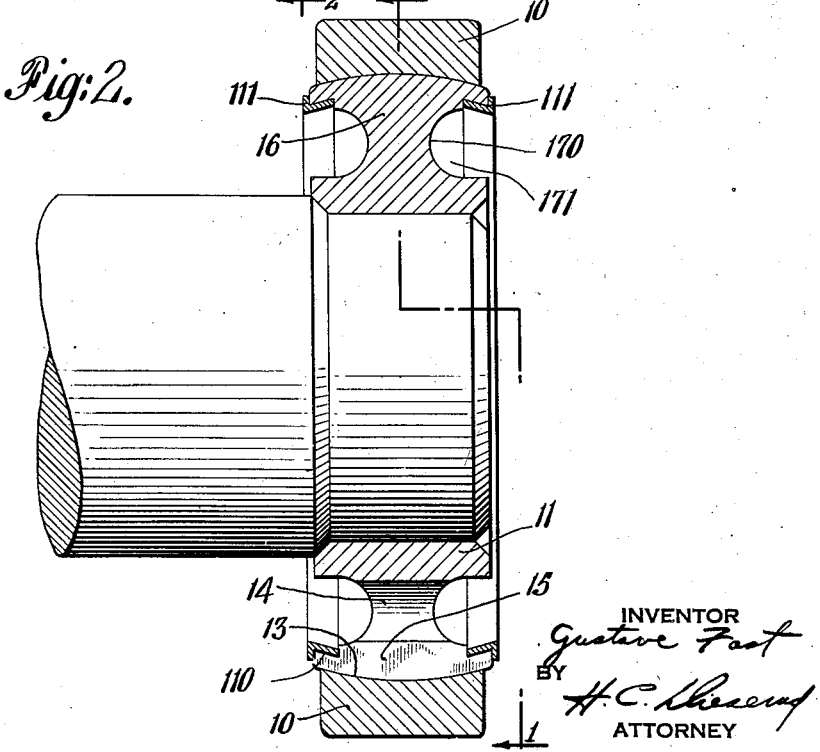
Fig. 2 is a vertical, axial section through the bearing and is taken along the line 2—2 of Figure 1.

Referring now to Figures 1 and 2 of the drawings, the bearing unit forming a preferred embodiment of the invention comprises an outer bearing member 10 and an inner journal member, 11 having a hub portion secured in any suitable way to a shaft 12. The members are preferably formed of materials having different hardness and microstructure. The bearing member 10 is retained by any convenient form of supporting structure providing a suitable housing (not shown) capable of retaining an adequate supply of lubricant. The inner face 13 of the bearing member may be of any of a variety of different forms, depending upon the particular service to which the bearing is to be put and depending upon other features of the construction. Ordinarily, it will be preferable to form the surface 13 as a portion of a sphere so that it is capable not only of supporting the radial load of the journal but also of resisting the axial thrusts of the journal.

The journal member 11, according to the preferred form of the invention, is provided with a series of cylindrical openings or passages 14 extending through the member from one face to the other and parallel with its axis. In line with the radii of the various passages 14 and with the radius of the member 11 are formed a plurality of slots or passages 15 extending from the outer face of the member 11 to the passages 14. This arrangement serves to provide a series of blocks 16, each separate from the other but all integrally united with the central hub portion of the member 11 by means of relatively slender neck portions 17 which are capable of bending or flexing to a limited extent under the heavy pressures developed during the use of the bearing. These neck portions are defined by the walls of the cylindrical passages 14 and by curved surfaces 170 formed by annular depressions 171, of substantially semicircular cross-section, provided in the opposite faces of the member 11. In this way the blocks 16 are formed with edges overhanging the neck portions 17 in all directions (see Figs. 1 and 2). The outer faces of the blocks preferably form portions of a spheroid having only a slightly smaller radius circumferentially than that of the surface 13 and having a radius of curvature in an axial direction equal to that of surface 13. Prior to the formation of the slots or passages 15, the outer surface of the journal member 11 will be in the form of a continuous, spheroidal surface having a radius of the character indicated. However, upon formation of the separate block portions in the manner explained, the ends 18 of each block are chamfered and/or rounded off slightly in the way indicated. This may be accomplished by a milling operation simultaneously with the formation of the slots 15. To assist in the accelerated flow, due to centrifugal force, of the lubricant to the cooperating surfaces between the members 10 and 11, an annular undercut surface 110 is preferably provided around each of the side faces of the blocks to provide shoulders into which may be spun annular lubricant feeding lips 111. It will be understood that in the rotation of the journal member, oil will flow, by gravity and due to suction, over the lips 111 into the passages 15 and from the latter will be forced between the bearing surfaces of the member 10 and the blocks 16.

Figure 4:
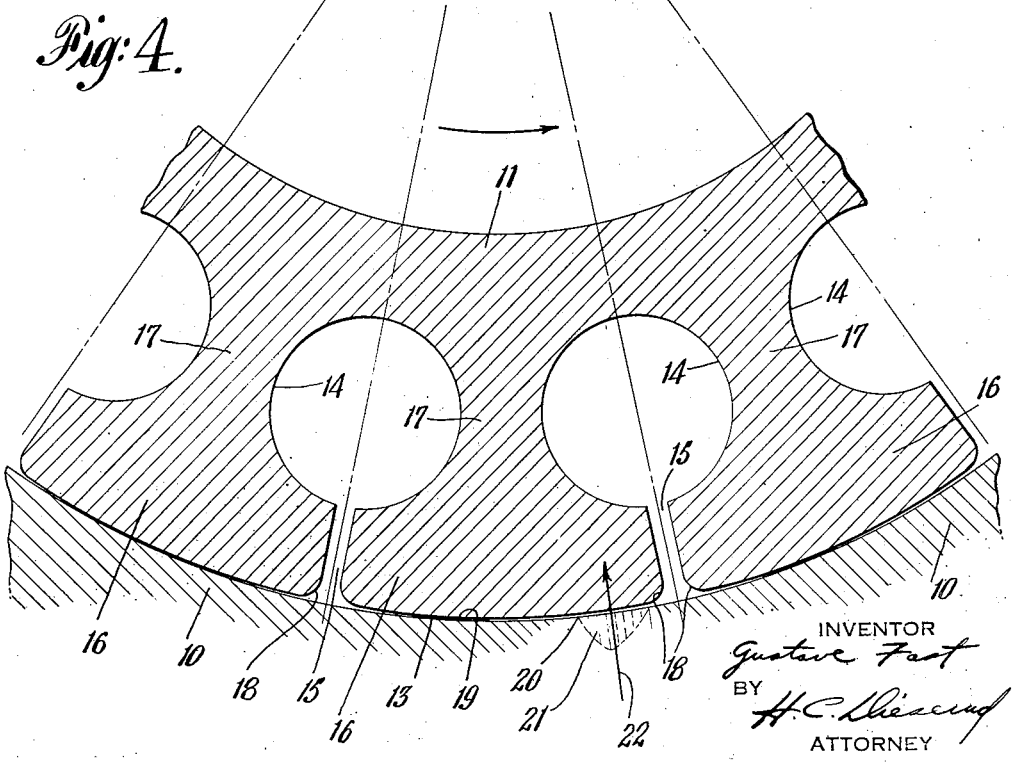
Fig. 4 is a similar diagram showing the relationship under light load conditions.

Referring now to Fig. 4, the action of the bearing under light load or under no load is schematically illustrated. The outer, spheroidal surface 19 of each block is, for the major portion thereof, spaced uniformly from the bearing surface 13. This spacing is, of course, exaggerated in Fig. 4, being normally so small as not to be capable of illustration on the scale shown. The rounding of the ends 18 of the blocks and, if desired, a slight tapering of the outer surfaces from these rounded corners a suitable distance toward the centers of these surfaces provides for the formation of small wedge-shaped film pockets during light or no-load operations. Under these conditions the blocks may be tilted very slightly by a bending of the necks 17 or a flexing of the ends of the blocks so that a point indicated at 20 becomes the point of nearest approach of the surfaces 13 and 19, and therefore the end of the pressure zone in the lubrication film, with the shaft rotating in a counter-clockwise direction. The pressure developed in the oil film at this time is represented diagrammatically by the lined area 21, the center of pressure being indicated by the arrow 22.

When the bearing is subjected to a heavy-load condition, however, the blocks, as they pass through the load-transmitting zone are tilted to a greater extent by the flexing of the relatively slender neck portions 18 due to the higher bending forces developed. The tilting of the block 16 at this time causes a greater spacing to be provided between the surfaces 13 and 19 adjacent the forward edge 23 of the block while the point of closest approach of the surface 19 to the surface 13, as the block passes through the load transmitting zone, is carried further back to the position designated 24 in Fig. 3, i. e., adjacent the rear end of the block, considering the direction of rotation of the journal to be counter-clockwise, as indicated by the arrow. The pressure developed within different portions of the film at this time is diagrammatically indicated by the lined area 25 while the center of pressure is indicated by the arrow 26. It will be seen, therefore, that a very large portion of the area of the outer face of the block is effective under heavy-load conditions. As each block passes out of the loaded zone it resumes its normal or undeflected position and it is then again deflected upon re-entering the loaded zone.

In Figs. 5, 6 and 7 there is illustrated a slightly modified form of construction. The outer bearing member 27 may be substantially the same as member 10 of Fig. 1 but the journal member 28 is provided with elongated passages 29 in lieu of the cylindrical passages 14 of the first form. Radial slots or passages 30 extend from the outer face of the journal member toward the centers of the passages 29 and thus divide the outer portion of the member into a series of blocks 31 integrally connected with the inner hub portion of the member by relatively slender neck portions 32. These neck portions may be of substantially the same form as the necks 17 of the first described embodiment of the invention. An advantage of this modified form of construction is that it permits the formation of more slender and more readily flexible neck portions with the production of a fewer number of blocks. Thus, in this modified form the number of blocks may be chosen at will to best suit the particular requirement of the bearing whereas in the first form the number of blocks is determined more or less by the dimensions required of the neck portions 17 and the limits of size of the passages 14 in order to provide the desired flexibility and strength. On the other hand, the first disclosed form of the invention is more economical to manufacture due to the fact that the passages 14 may simply be drilled and suitably finished whereas each of the passages 29 requires two or more drilling operations as well as milling or broaching operations. Accordingly, for most purposes the first described embodiment will be found preferable.

The assembly of either of the described forms of the bearing may be accomplished in various ways. Figs. 5, 6 and 7 illustrate one mode of assembly, involving the provision of a slot 33 having radial sides extending axially of the bearing member 27. This slot is of sufficient depth and width to enable the insertion of the member 28 into the member 27 when the plane of the member 28 is held at right angles to that of the member 27. For this purpose the member 28 must be elevated slightly into the recess or slot 33 and then when it is centrally positioned, it may be dropped to bring the spherical surface of one of the blocks against the spherical, inner surface of the bearing. When this is accomplished it is possible to slide the member 28 around the interior of the member 27 through an arc of 90° until the parts assume the position indicated in Fig. 5. At this time a filler block 34, having an inner, spherical face 35, may be inserted in the slot or recess 33 and the member 28 may then be rotated about an axis perpendicular to the plane of the drawing (Fig. 5) until the members 27 and 28 are brought into the proper relation as indicated by Fig. 6. No special means are required for retaining the block 34 in proper position as the locking action of the journal member itself may be relied upon for this. The block is preferably formed to provide a very snug fit within the recess 33 and the spherical surface of the bearing, including the inner face of the block, is preferably finished by diamond boring and honing operations. When this is done the presence of the block can hardly be detected.

Figure 8:
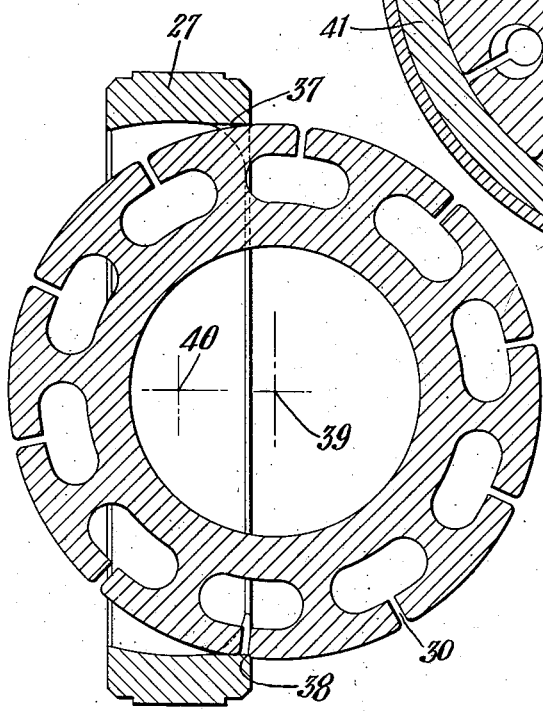
Fig. 8 is a vertical sectional view illustrating the relation between the journal and bearing members of Figure 1 at an intermediate stage in the course of assembly.

A somewhat different mode of assembly is illustrated in Figs. 1 and 8. In lieu of providing a single slot or recess, such as 33, extending completely across the bearing member, a pair of shallow slots 36 are provided at diametrically opposite points of the bearing member 10 or 27. These slots extend merely from one face of the bearing member less than half-way across the width of this member and this construction is such that over a limited area at diametrically opposed points the inner surface 37 of the bearing member is substantially cylindrical rather than spherical. Now, to assemble the journal member within the bearing, it is simply necessary to place one of the slots 30 of the journal member over the corner 38 of one of the cut-away portions 36 of the bearing member. The journal member may then be rocked about this corner until its center 39 coincides with the center 40 of the bearing member. At this time the journal member may be revolved into the plane of the bearing and the assembly is thus completed. In the use of a bearing of this construction, it has been found that the cut-away portions 36 interfere very little with the development of the desired lubricant films regardless of their location with respect to the heavy load zone.

Figure 3:
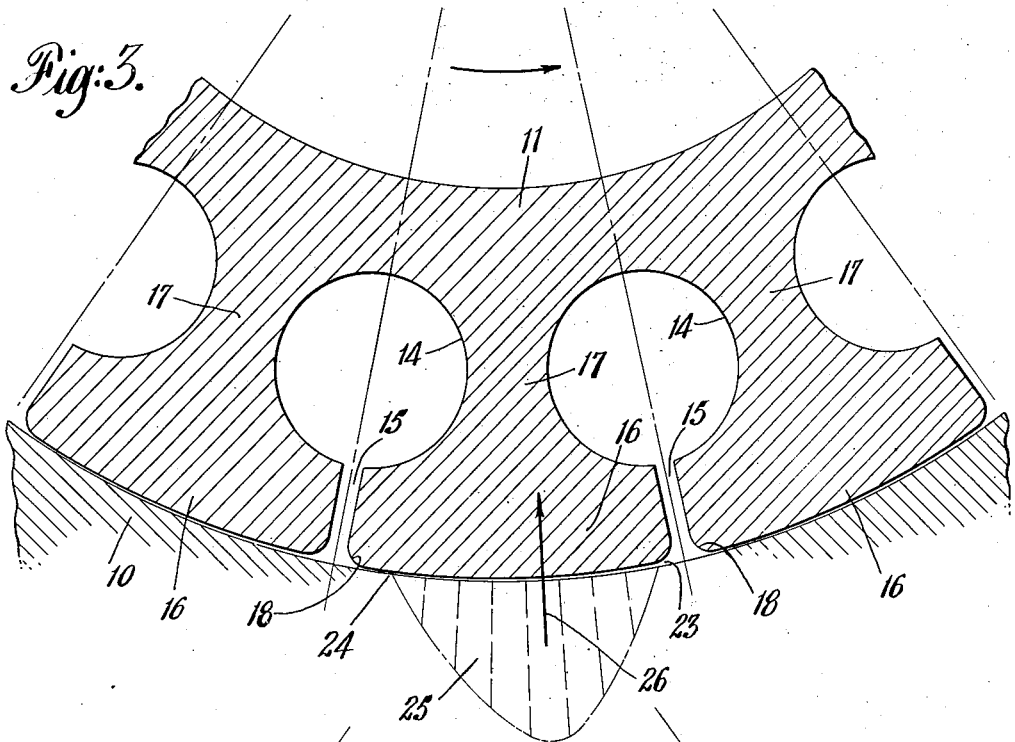
Fig. 3 is a diagrammatic view on an enlarged scale showing the relation between the blocks and the bearing surface of the construction shown in Figure 1 under heavy load conditions.
Figure 9:
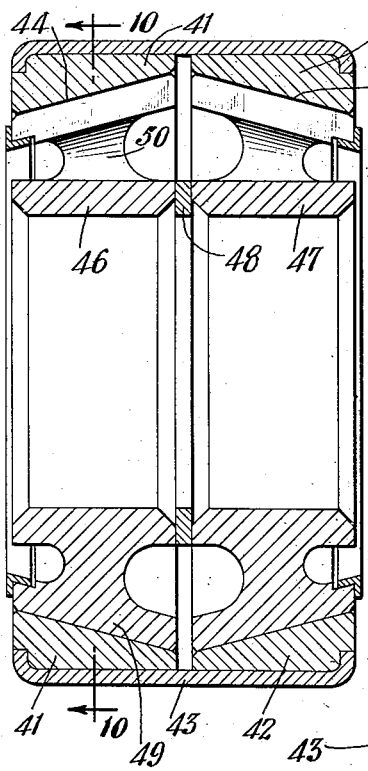
Fig. 9 is an axial section through a double, conical bearing constructed in accordance with the invention.
Figure 10:
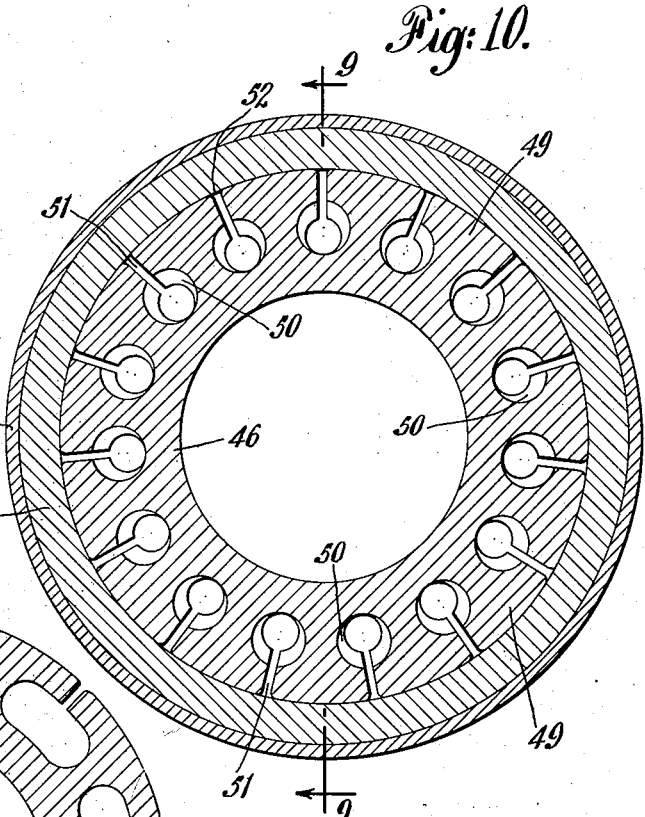
Fig. 10 is a vertical section through this bearing taken along the line 10—10 of Figure 9.

While the preferred form of the improved construction involves a spherical seat in the bearing member and spheroidal, outer faces on the blocks, surfaces of other forms may be employed under certain conditions, if desired. The spherical form not only serves excellently to support a radial load but it also takes the axial thrusts in both directions and at the same time allows a universal or self-aligning action between the bearing and journal members. If the relative, axial thrusts of the journal and bearing are taken care of in other ways and no universal action is required, the bearing surfaces may simply be cylindrical. If the bearing must take care of axial thrusts in one direction in addition to the radial load, a conical form of bearing surface may be employed. Should it be necessary to take care of relative axial thrusts in both directions without a universal action, this may be accomplished by the double conical form illustrated in Figs. 9 and 10. In this form the bearing comprises two bearing members 41 and 42 assembled in any convenient way, as by means of a ferrule 43. The inner faces 44 and 45 of the bearing members are of conical form and are arranged in reverse relation. Journal members 46 and 47, preferably spaced by a ring 48, are arranged to be suitably secured to a shaft and these journal members have their outer portions divided into a series of separate blocks 49 each integrally connected by a flexible neck portion with one of a pair of annular supports. The blocks are formed by a series of tapered passages 50 extending from one face to the other of each of the journal members and by a series of radially extending slots 51. Passages 50 may be either elongated in cross-section or circular. In the latter case they will preferably be of conical form and arranged with the innermost element of the cone parallel with the journal axis and the outermost element of the cone parallel with the nearest element of the conical bearing surface. The corners 52 of each of the blocks are preferably chamfered and rounded, as in the first disclosed form of the invention. Under light or no-load conditions, the outer surfaces of the blocks 49 constitute portions of a cone spaced uniformly a slight distance from the conical surface 44 or 45. However, under heavy-load conditions the blocks 49 will tilt, as permitted by the supporting neck portions and a condition similar to that illustrated in Fig. 3 is brought about.

While certain preferred forms of construction have been disclosed in considerable detail it will be understood that numerous changes in the construction and arrangement of the parts may be made without departing from the general principles and scope of the invention. In a structure in which a bearing member revolves upon and about a fixed supporting shaft the blocks may be formed at the inner surface of a revolving bearing ring. If the journal is to be rotated constantly in one direction the slots 15, 30 or 51 may be formed at one side of the centers of the passages 14, 29 or 50 so that the blocks will extend a greater distance beyond the supporting necks in the direction of rotation and a correspondingly shorter distance in the opposite direction. A similar result may be accomplished by forming the slots 15, 30 or 51 at an angle to the radial plane as shown. Accordingly it should be understood that the invention is not restricted to the radial disposition of the slots with respect to the axis of the journal member or the axially extending passages through this member nor to the central arrangement of the slots. The terms and expressions used herein are to be regarded as terms of description and not of limitation.

What I claim is:

1. In a device of the class described a bearing member, and a journal member cooperating with said bearing member, said journal member comprising an annular support and a series of blocks integrally connected with said support, each of said blocks having a face formed as a surface of revolution cooperating with said bearing member, said faces of said blocks being in substantial parallelism with said bearing member when not under load, the connection between said blocks and said support comprising relatively slender neck portions sufficiently flexible to yield and form wedge-shaped film pockets between said faces of the bearing member under bending forces applied to the blocks upon the application of a load to the bearing.

2. In a device of the class described a radial bearing member, and a journal member cooperating with said bearing member, said journal member comprising an annular support and a series of blocks integrally connected with said support and disposed radially thereof, each of said blocks having a face formed as a surface of revolution cooperating with said bearing member, said faces of said blocks being in substantial parallelism with said bearing member when not under load, the connection between said blocks and said support comprising relatively slender neck portions sufficiently flexible to yield and form wedge-shaped film pockets between said faces of the bearing member under bending forces applied to the blocks upon rotation of the journal under load.

3. In a device of the class described, a bearing member, and a journal member cooperating with said bearing member, said journal member comprising an annular support and a series of blocks integrally connected with said support, said blocks presenting a substantially continuous, circumferential outer face in substantial parallelism with the bearing surfaces of said bearing member and being connected with said support by relatively slender neck portions sufficiently flexible to yield and form wedge-shaped film pockets between the blocks and bearing member under bending forces applied to the blocks upon rotation of the journal under load.

4. In a device of the class described, a bearing member, and a journal member cooperating with said bearing member, said journal member comprising an annular support and a series of blocks integrally connected with said support, said blocks presenting a substantially continuous, circumferential outer face in substantial parallelism with the bearing surfaces of said bearing member and being connected with said support by relatively slender neck portions sufficiently flexible to yield and form wedge-shaped film pockets between the blocks and bearing member under bending forces applied to the blocks upon rotation of the journal under load, said neck portions being separated from each other by circular openings extending through said journal member.

5. In a device of the class described a bearing member and a journal member cooperating with said bearing member, said journal member comprising an annular hub portion and a plurality of separate blocks, said blocks having their ends slightly spaced but forming a substantially complete ring presenting a surface of revolution when not under load, each block being integrally united with said hub portion by a slender neck sufficiently flexible to yield upon the development of a film pressure between said block and said bearing member and form a wedge-shaped film pocket therebetween, adjacent pairs of said necks defining cylindrical, axially extending passages through said journal member.

6. In a device of the class described a bearing member and a journal member, said members having cooperating spherical surfaces in substantial parallelism when the bearing is not under load, one of said surfaces being continuous and the other divided into a plurality of sections, each of said sections being carried by an integral neck portion of its member, said integral neck portions being constructed and arranged to flex with relation to the main body of said member and form wedge-shaped film pockets between said sections and the cooperating surfaces upon rotation of the journal member under load.

7. A journal for a block type radial bearing which comprises an integral unitary ring member having a plurality of axially extending passages therethrough and a plurality of slots extending from the outer surface thereof to said passages, said slots and passages dividing the outer portion of said member into a series of individual blocks connected by flexible neck portions with an annular inner portion of said member, the outer faces of said blocks when not under load forming a substantially continuous surface of revolution of spherical form, said neck portions being sufficiently flexible to yield slightly and enable said blocks to tilt upon application of a load to the bearing.

8. A journal for a block type radial bearing which comprises an integral unitary ring member having a plurality of axially extending passages therethrough and a plurality of slots extending from the outer surface thereof to said passages, said slots and passages dividing the outer portion of said member into a series of individual blocks connected by flexible neck portions with an annular inner portion of said member, the outer faces of said blocks when not under load forming a substantially continuous surface of revolution of conical form, said neck portions being sufficiently flexible to yield slightly and enable said blocks to tilt upon application of a load to the bearing.

9. A journal for a block type radial bearing which comprises an integral unitary ring member having a plurality of axially extending passages therethrough and a plurality of slots extending from the outer surface thereof to said passages, said slots and passages dividing the outer portion of said member into a series of individual blocks connected by flexible neck portions with an annular inner portion of said member, the outer faces of said blocks when not under load forming a substantially continuous surface of revolution of spherical form, said neck portions being sufficiently flexible to yield slightly and enable said blocks to tilt upon application of a load to the bearing, said blocks terminating adjacent said slots in slightly rounded corners.

10. In a device of the class described bearing means having a pair of conical bearing surfaces tapering toward the axis of said means in opposite directions from a central, transverse plane, and journal means having annular supporting means and a plurality of blocks integrally connected therewith by flexible neck portions, said neck portions being constructed and arranged to yield slightly upon application of a load to the bearing, said blocks having outer surfaces forming portions of cones in substantial parallelism with said conical bearing surfaces when not under load and tilted with respect to said bearing surfaces to provide wedge-shaped pockets when under load.

11. In a device of the class described a bearing member having a spherical surface and a journal member having a substantially spherical surface cooperating with said bearing member, the bearing member having one arcuate slot with radial sides to permit assembly of the journal member in the bearing and a filler piece fitted in this slot of such shape as to conform to the bearing surface, the block being held in proper position through interlocking engagement with the bearing member and the journal member without any extraneous locking means.

12. In a device of the class described, a bearing member and a journal member, said members having cooperating spherical surfaces, said surface on the bearing member being continuous and said surface on the journal member being divided into a plurality of sections, each of said sections being carried by an integral portion of the journal member in a position which under normal no-load conditions retains the spherical surface of each section in substantial parallelism with the cooperating spherical surface of the bearing member, said integral portions being sufficiently flexible to flex with relation to the main body of the journal member and incline the spherical surface of each section out of parallelism with the cooperating spherical surface of the bearing member and thus provide wedge-shaped film pockets upon rotation of the journal member under load.

13. In a device of the class described a journal member, a bearing member, and retaining means separate from and surrounding said bearing member, said members and retaining means being constructed and arranged to transmit the load from one to another through surfaces of substantial area which are in substantial parallelism, one of said members having a plurality of sections integrally joined as a part of the member through flexible connecting portions, each of said sections having a surface of revolution normally in substantial parallelism with a corresponding cooperating surface on the other of said members when the bearing is not under load, said connecting portions being adapted to flex so that said sections will form wedge-shaped film pockets between said cooperating surfaces of revolution upon rotation of the journal member in either direction under load.

14. In a device of the class described a journal member, a bearing member, and retaining means separate from and surrounding said bearing member, said members and retaining means being constructed and arranged to transmit the load from one to another through surfaces of substantial area which are in substantial parallelism, certain of said surfaces being of spherical form, one of said members having a plurality of sections integrally joined as a part of the member through flexible connecting portions, each of said sections having a surface of revolution normally in substantial parallelism with a corresponding cooperating surface on the other of said members when the bearing is not under load, said connecting portions being adapted to flex so that said sections will form wedge-shaped film pockets between said cooperating surfaces of revolution upon rotation of the journal member in either direction under load.

15. In a device of the class described a bearing member and a journal member, elements for transmitting and receiving loads to and from said members, said members having cooperating surfaces of revolution in substantial parallelism when the bearing is not under load, one of said surfaces being continuous and the other divided into a plurality of sections, said sections forming integral portions of their member through flexible connecting portions adapted to flex so that said sections will form wedge-shaped film pockets with the cooperating surface upon rotation of the journal member under load, said sections being symmetrically arranged with respect to said flexible connecting portions, said load receiving and transmitting elements being constructed and arranged to provide in conjunction with said members and the oil films radial load supporting columns of substantial cross sectional area throughout.

16. In a device of the class described a bearing member and a journal member, elements for transmitting and receiving loads to and from said members, said members having cooperating surfaces of revolution in substantial parallelism when the bearing is not under load, one of said surfaces being continuous and the other divided into a plurality of sections, said sections forming integral portions of their member through flexible connecting portions adapted to flex so that said sections will form wedge-shaped film pockets with the cooperating surface upon rotation of the journal member under load, said sections being symmetrically arranged with respect to said flexible connecting portions, said load receiving and transmitting elements and members having substantially parallel engaging surfaces of substantial extent.

GUSTAVE FAST.